United States Patent [19]

Kage

[11] Patent Number: 4,709,376
[45] Date of Patent: Nov. 24, 1987

[54] RECEIVED SIGNAL PROCESSING APPARATUS

[75] Inventor: Kouzou Kage, Tokyo, Japan

[73] Assignee: NEC Corporation, Japan

[21] Appl. No.: 830,669

[22] Filed: Feb. 19, 1986

[30] Foreign Application Priority Data

Feb. 22, 1985 [JP] Japan .................................. 60-34226
Feb. 22, 1985 [JP] Japan .................................. 60-34227

[51] Int. Cl.$^4$ .......................... H04B 1/10; H04L 1/08
[52] U.S. Cl. ........................................ 375/58; 375/99; 371/5; 371/36; 371/69
[58] Field of Search ...................... 371/5, 6, 36, 69, 70; 375/38, 40, 99, 102, 58, 117; 370/61

[56] References Cited

U.S. PATENT DOCUMENTS 3,842,399 10/1974 Kneuer et al. ......................... 371/69
3,863,215 1/1975 McGrogan, Jr. ...................... 371/69
4,227,175 10/1980 Newman ............................... 371/69

Primary Examiner—Benedict V. Safourek
Assistant Examiner—Andrew J. Telesz, Jr.
Attorney, Agent, or Firm—Laff, Whitesel, Conte & Saret

[57] ABSTRACT

An apparatus for processing a digital signal which is transmitted from a transmit station by radio equipment and contains the same repetitive information employs the principle of decision by majority. A particular signal pattern with the least error rate is determined by majority. Noncoincident bits between the determined signal pattern and each of the repeatedly received patterns are counted and, then, the number of noncoincident bits is determined on each of a predetermined number of patterns which are selected by a selector out of the repeatedly received ones. When the number is smaller than a predetermined one, the pattern is allowed for processing. That is, the signal pattern is processed by measuring the bit error rate in a transmission path with the signal pattern equivalently used as a reference.

4 Claims, 7 Drawing Figures

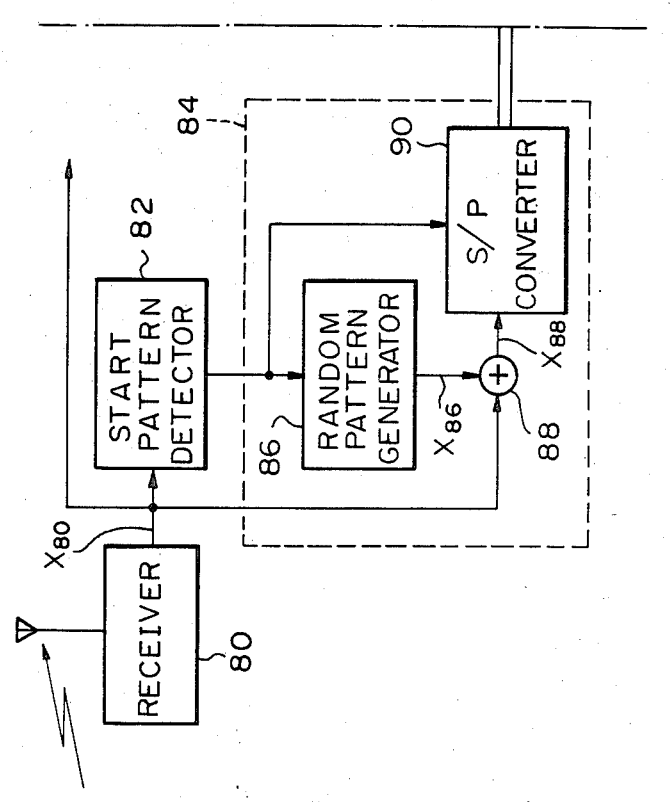

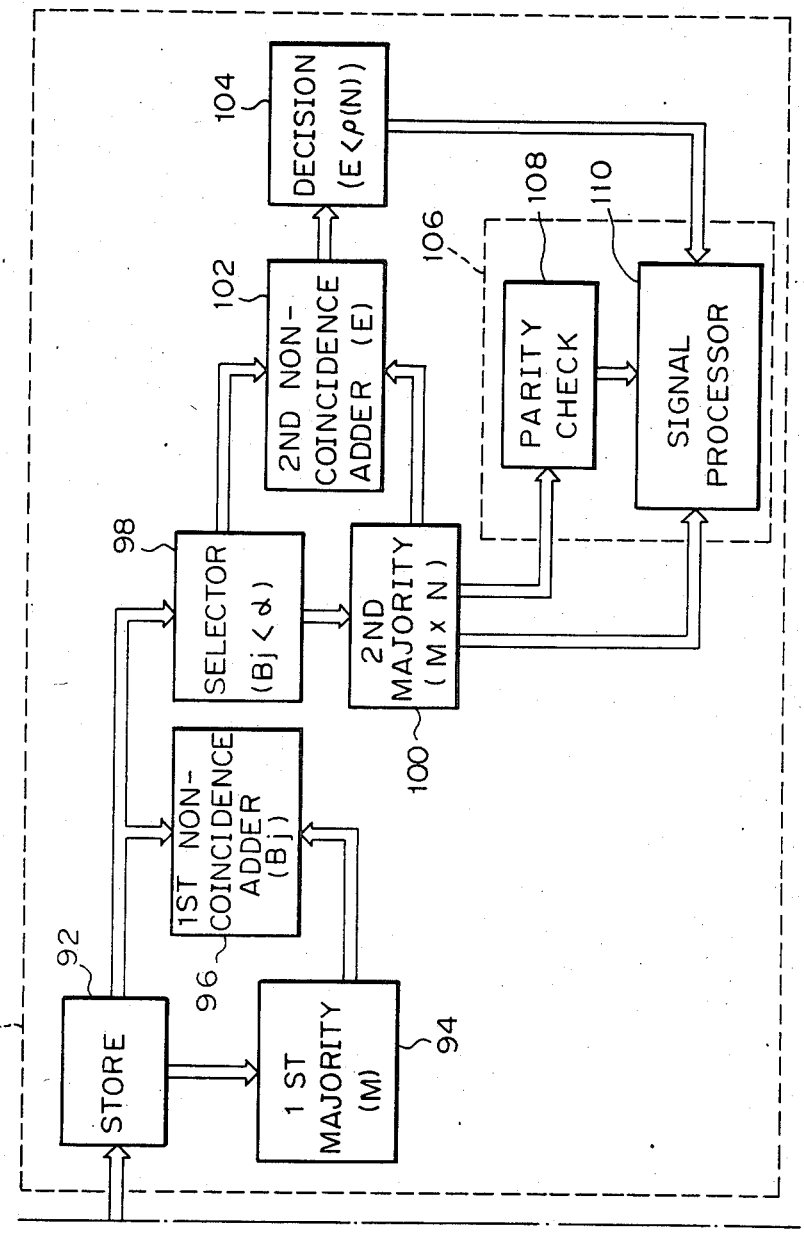

RECEIVED SIGNAL PROCESSING APPARATUS

BACKGROUND OF THE INVENTION

The present invention relates to a received signal processing apparatus for processing with a majority principle a repetitive digital signal which is transmitted from a transmit station by radio equipment and representative of the same information.

In communications art, there is known an error correction system in which while a transmit station transmits the same information repeatedly, a receive station corrects errors on a decision-by-majority basis so as to enhance reliability of information. This kind of system is simpler than the other known error correction systems and extensively used. In the system employing the majority principle, how to detect errors is the important problem. Some approaches have heretofore been proposed for the detection of errors, e.g., one which determines whether the same pattern repeatedly occurs and, if it does, processes a received signal as a correct signal, and one which determines a field intensity of a received signal and, if it is at a sufficient level, processes it on a majority basis to determine the transmission quality of the signal.

The problem with the repetitive pattern scheme is that where the error probability is very high such as where the bit error rate is $10^{-2}$ or higher, and where a single information pattern has 50 to 100 bits, for example, the probability that the received signal is decided correct is sharply reduced and, instead, the probability that no signal is detected, i.e., the non-detection probability is increased. On the other hand, the field intensity scheme fails to provide satisfactory information on the deterioration of signals partly because upon appearance of an interference wave the system decides that the field intensity is sufficient and, therefore, fails to detect an error which actually exists in a signal, and partly because depending upon temperature and other ambient conditions the measured field intensity information and the bit error rate of received signal do not always constantly correspond to each other.

SUMMARY OF THE INVENTION

It is therefore an object of the present invention to provide a received signal processing apparatus which despite the decision-by-majority principle achieves a considerably high error detection probability.

It is another object of the present invention to provide a generally improved received signal processing apparatus.

In one aspect of the present invention, there is provided an apparatus for processing a digital received signal in which the same information appears repeatedly, comprising a start pattern detector for detecting a start pattern which precedes M repetitive information patterns which are transmitted, an information pattern receive circuit for receiving the M information patterns timed to detection of the start pattern by the start pattern detector, a store for storing the M information patterns which are received by the information pattern receive circuit, a majority decision circuit for applying majority decision to the M information patterns, which are stored in the store, on a basis of bits which represent the same information so as to determine a single pattern, a noncoincidence adder for determining noncoincident bits between the pattern decided by the majority decision circuit and each of the M information patterns stored in the store and, then, adding the noncoincident bits, a decision circuit for determining that the pattern decided by the majority decision circuit is acceptable for processing when a result of summation by the noncoincidence adder is smaller than a predetermined reference value, and a signal processor for processing the pattern decided by the majority decision circuit when the decision circuit has decided that the pattern is acceptable.

In another aspect of the present invention, there is provided an apparatus for processing a digital received signal in which the same information appears repeatedly, comprising a start pattern detector for detecting a start pattern which precedes a signal sequence in which M same information patterns appear repeatedly, the signal sequence being transmitted L consecutive times, an information pattern receive circuit for receiving the M information patterns timed to detection of a start pattern by the start pattern detector, a store for storing the M information patterns which are received by the information pattern receive circuit, a first majority decision circuit for applying majority decision to the M information patterns, which are stored in the store, on a basis of bits which are representative of same information so as to decide a single pattern, a first noncoincidence adder for determining noncoincident bits between the pattern decided by the first majority decision circuit and each of the M information patterns stored in the store and, then, adding the numbers of noncoincident bits, a selector for selecting out of the signal sequences, each of which comprises the M information patterns, those in which a sum of the noncoincident bits is smaller than a predetermined reference value, a second majority decision circuit for applying majority decision to all the M×N information patterns contained in N signal sequences which are selected by the selector so as to decide a single pattern, a second noncoincidence adder for determining noncoincident bits between the result provided by the second majority decision circuit and each of the M×N information patterns which are selected by the selector and then adding the numbers of noncoincident bits, a decision circuit for deciding that the pattern decided by the second majority decision circuit acceptable for processing when a sum of the noncoincident bits provided by the second noncoincidence adder is smaller than a predetermined value $\rho$ (N) which is determined by the N, and a signal processor for processing the pattern decided by the second majority decision circuit when the decision circuit has determined that the pattern is acceptable.

The above and other objects, features and advantages of the present invention will become more apparent from the following detailed description taken with the accompanying drawings.

BRIEF DESCRIPTION OF THE DRAWINGS

FIGS. 3A and 3B are block diagrams showing a second embodiment of the present invention.

DESCRIPTION OF THE PREFERRED EMBODIMENTS

While the received signal processing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1A:
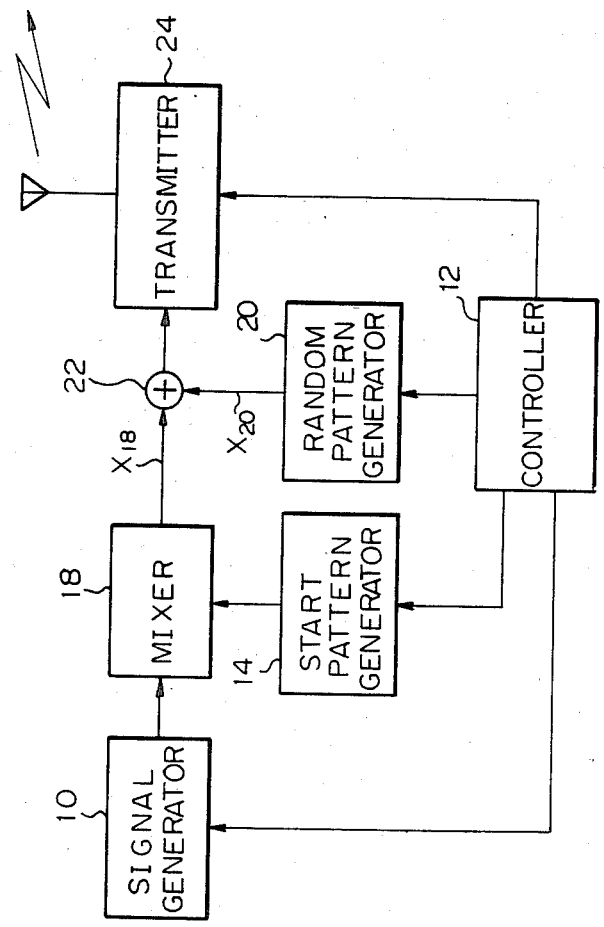
FIGS. 1A and 1B are block diagrams showing a first embodiment of the received signal processing apparatus of the present invention.
Figures 1, 1B:
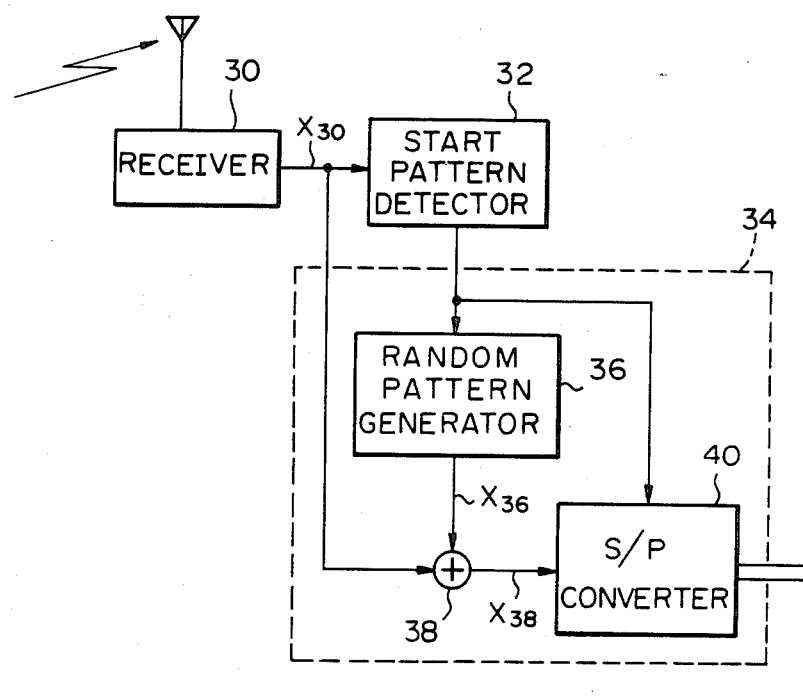

Referring to FIGS. 1A and 1B, a received signal processing apparatus representative of a first embodiment of the present invention is shown. FIG. 1A is a block diagram showing a transmit station which produces a predetermined digital signal, while FIG. 1B is a block diagram showing a receive station which receives the digital signal.

Figures 1, 1B, 2:
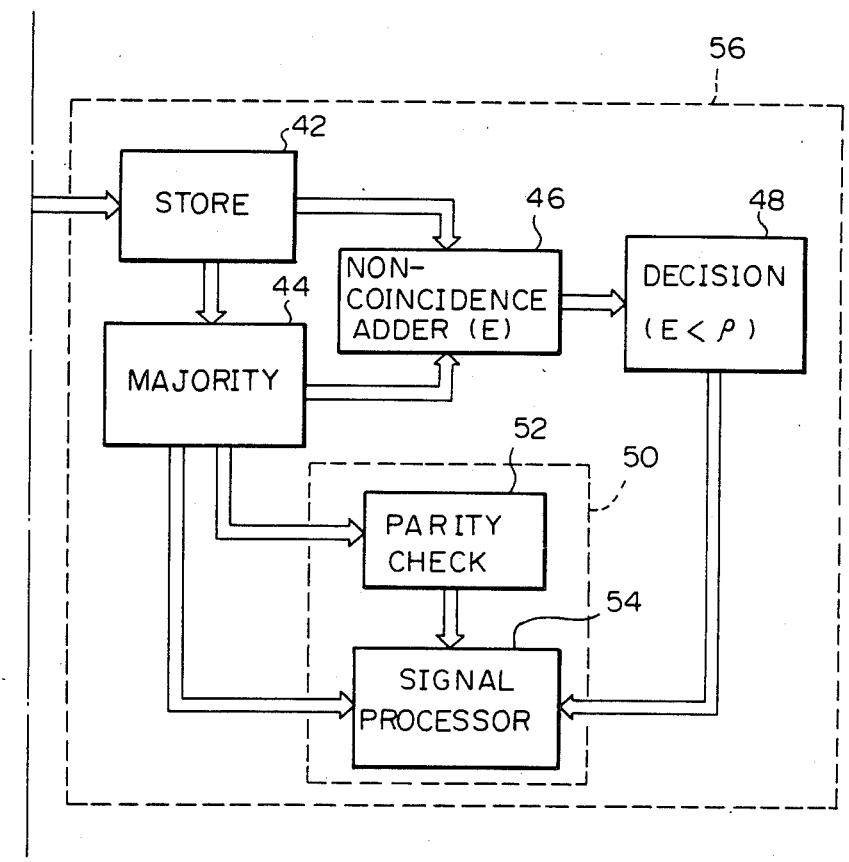
FIG. 2 shows formats of signals which appear in various sections of the circuitries shown in FIGS. 1A and 1B.
Figure 2:
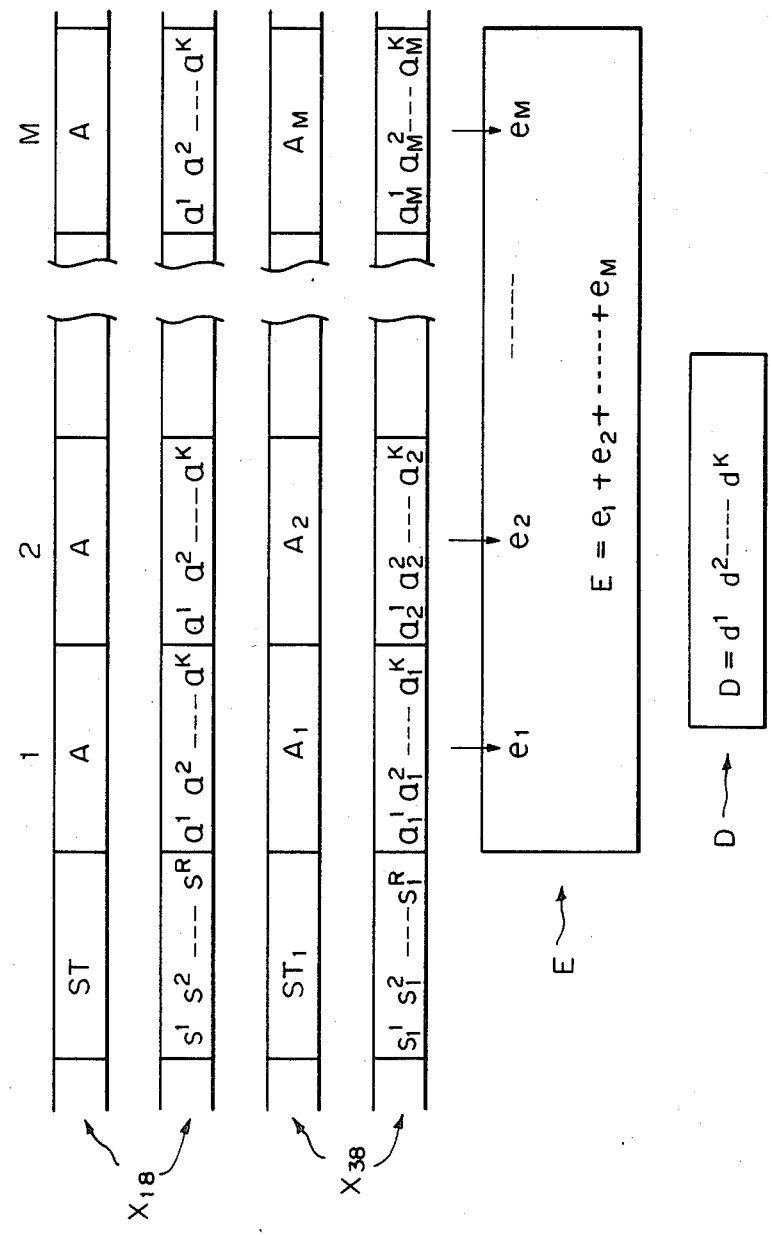

As shown in FIG. 1A, the transmit station includes a signal generator 10 adapted to generate an information pattern having K bits, i.e. $A = a^1 a^2 \ldots a^k$. Controlled by a controller 12, the signal generator 10 delivers M (equal to or greater than 2) consecutive patterns A. A start pattern generator 14, which is also controlled by the controller 12, produces before the information patterns AA ... A a fixed start pattern ST having R bits, i.e. $ST = S^1 S^2 \ldots S^R$. The outputs of the signal generator 10 and start pattern generator 14 are mixed by a mixer 18 to become an information signal stream $X_{18}$, in which the start pattern ST precedes the information patterns AA ... A as shown in FIG. 2.

A random pattern generator 20, which is also controlled by the controller 12, generates random numbers $X_{20}$ which are added to the information signal stream $X_{18}$ by an adder 22. The output of the adder 22 is applied to a transmitter 24 to be sent to the receive station. The reason why the random numbers $X_{20}$ are added to the information signal stream $X_{18}$ is that since the signal stream $X_{18}$ is a sequence of the same repetitive pattern A, applying it directly to the transmitter 24 would adversely affect the modulation characteristic due to periodic fluctuation of the frequency component. Thus, the random numbers $X_{20}$ are added to the repetitive patterns AA ... A. The controller 12, as described, controls the timing of signal generation by the signal generator 10, that of generation of start patterns by the start pattern generator 14, that of generation of random numbers by the random pattern generator 20, and transmission by the transmitter 24.

Referring to FIG. 1B, the receive station includes a receiver 30 which applies a received signal $X_{30}$ to a start pattern detector 32. After the detector 32 has detected a start pattern ST, information pattern receive means 34 receives information patterns which follow the start pattern ST. The information pattern receive means 34 comprises a random pattern generator 36 adapted to generate the same random numbers $X_{36}$ as the random numbers $X_{20}$, an adder 38, and a serial-to-parallel (SP) converter 40. The adder 38 adds the output $X_{36}$ of the random pattern generator 36 to that $X_{30}$ of the receiver 30 so as to recover a signal stream which corresponds to the signal stream $X_{18}$ prepared at the transmit station. The serial recovered signal stream is transformed into parallel information by the SP converter 40 in order to facilitate the subsequent processing.

The information signal stream outputted by the adder 38 will be described in detail. As shown in FIG. 2, the start pattern ST and the M information patterns AA ... A prepared at the transmit station will be received by the receive station as a different pattern $ST_1 A_1 A_2 \ldots A_M$ due to errors which are attributable to noise occurring in the transmission path. In FIG. 2, $ST_1$ and $A_m$ are represented by:

$$ST_1 = S_1{}^1 S_1{}^2 \ldots S_1{}^R$$

$$A_m = a_m a_m \ldots a_m{}^K \ (m = 1, 2, \ldots, M)$$

If each pattern in the transmission path is free from error, all the bits are $$S_1{}^1 S_1{}^2 \ldots S_1{}^R = S^1 S^2 \ldots S^R$$

$$a_m{}^1 a_m{}^2 \ldots a_1{}^K = a^1 a^2 a^K \ (m = 1, 2, \ldots, M)$$

Hence, $$ST_1 = ST$$

$$A_m = A \ (m = x, 1, \ldots, M)$$

The parallel outputs of the information pattern receive means 34 are stored in a store 42 as $A_1, A_2, \ldots, A_M$. The data stored in the store 42 are read out and applied to a majority circuit 44 which then checks the bits of the patterns $A_1, A_2, \ldots, A_M$ each representative of the same information and, by majority, desides a single pattern $D = d^1 d^2 \ldots d^k$. For example, $d^k$ is the result of checking $a_1{}^k, a_1{}^k, \ldots, a_m{}^K$ for majority; if the number of ONEs is greater than that of ZEROs, $d_k = \text{ONE}$.

The quality of the pattern D as shown in FIG. 2 is measured by a noncoincidence adder 46. Specifically, assuming that the number of noncoincident bits of the pattern D and pattern $A_m$ is $e_m$ (m = 1, 2, ..., M), the noncoincidence adder 46 performs the following calculation as shown in FIG. 2:

$$E = e_1 + e_2 + e_M$$

It will be seen that the greater the sum E is, the greater the error rate in the transmission path and, therefore, the poorer the quality of the pattern D is. A decision circuit 48 determines whether the output E of the noncoincidence adder 46 is smaller than a predetermined reference value $\rho$. If the result of decision is $E < \rho$, then signal processor means 50 is allowed to process the received signal regarding the pattern D acceptable.

The signal processor means 50 includes a parity check circuit 52 which serves to check the pattern which has been decided by the majority circuit 44. Specifically, the information pattern A generated at the transmit station includes parity check bits so that the receive station may perform parity check on the result of decision D. Hence, when determined normal by the parity check circuit 52 and decided acceptable by the decision circuit 48, the pattern D is ready to be processed by the signal processor 54. Since the error rate of each bit which constitutes the pattern D is low, the effect of the parity check is considerable.

In summary, the system in the illustrative embodiment is constructed to determine a signal pattern D having the lowest error rate by decision by majority, count those bits which are noncoincident with those of the repetitively received patterns $A_1, A_2, \ldots, A_M$, and allow the signal pattern D to be processed when the sum is smaller than a predetermined value. Stated another way, the system processes D after measuring the bit error rate of a transmission path with D equivalently used as a reference. The advantage attainable with such a system is that the bit error rate can be measured more accurately as the number of bits of the pattern A increases.

Figure 3A:
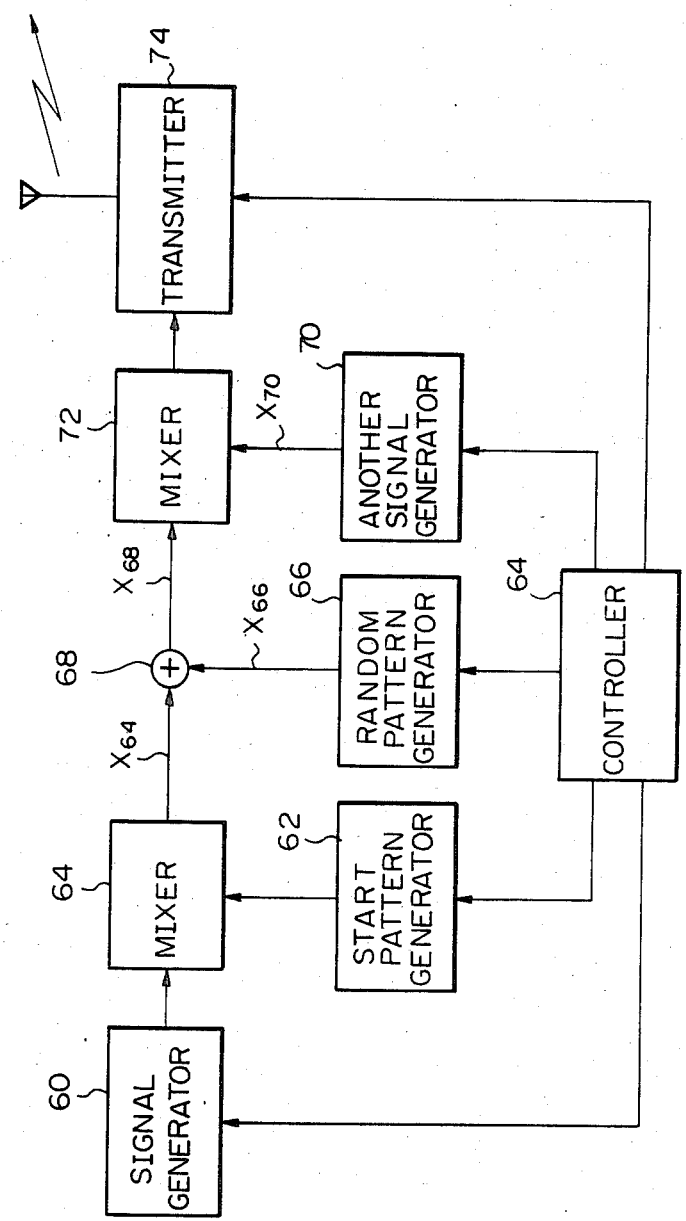

Referring to FIGS. 3A and 3B, a second embodiment of the present invention is shown. FIG. 3A shows a transmit station which sends a predetermined digital signal, while FIG. 3B shows a receive station which receives the digital signal.

Figure 4:
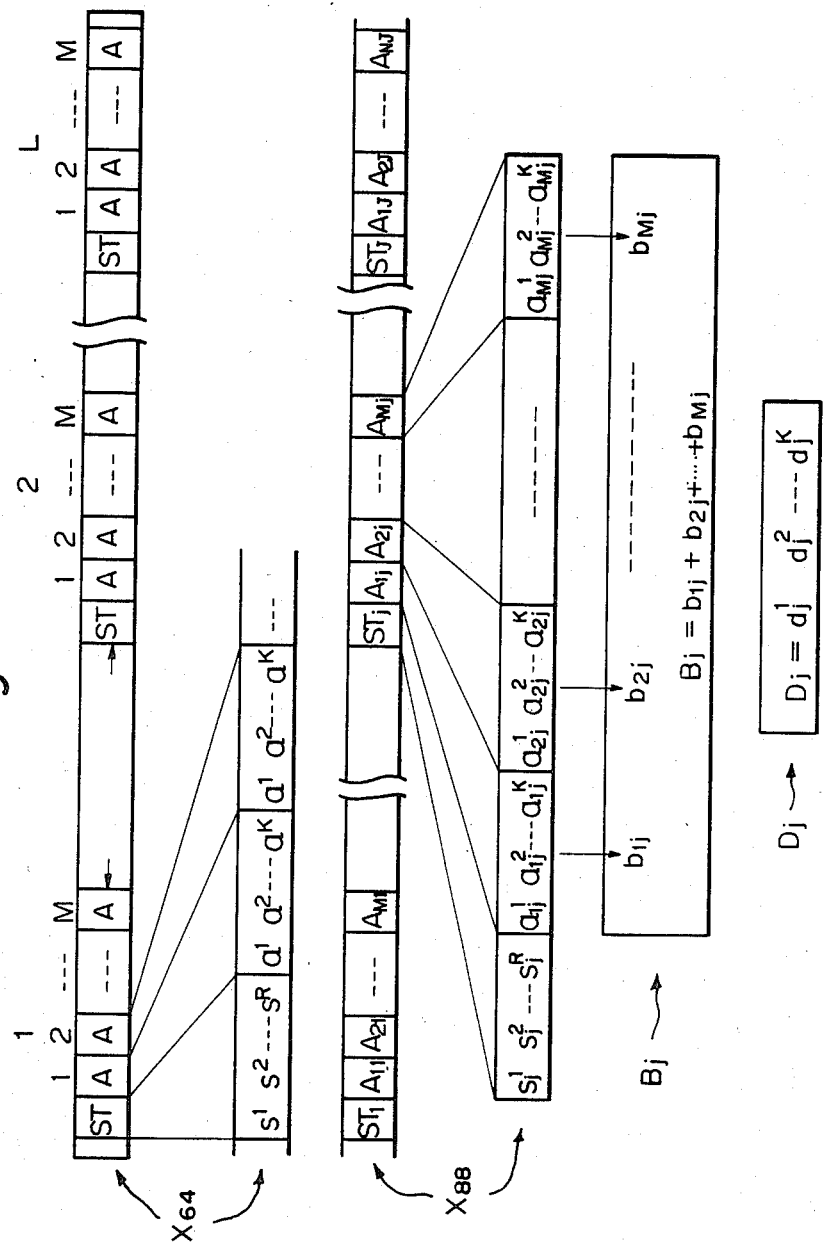
FIG. 4 shows formats of signals which appear in various sections of the circuitries shown in FIGS. 3A and 3B.

As shown in FIG. 3A, the transmit station includes a signal generator 60 and a start pattern generator 62 both of which are controlled by a controller 64. As the controller 64 applies a single information transmit command to each of the signal generator 60 and the start pattern generator 62, the generator 62 generates R bits of fixed start pattern $T=S^1 S^2 \ldots S^R$ and, then, the generator 60 repeatedly generates a K bits of information pattern $A=a^1 a^2 \ldots a^K$ M times (equal to or greater than 1). Hence, when L (equal to or greater than 2) information transmit commands have appeared consecutively within one transmit section, the above operation occurs L consecutive times transmitting $L \times M$ information patterns in total. A mixer 64 mixes the outputs of the signal generator 60 and start pattern generator 62 to produce an information signal stream $X_{64}$ as shown in FIG. 4. As will be noted, the pattern sequences STAA ... A and STAA ... A are not always continuous so that the intervals may be used for other information.

Controlled by the controller 64, a random pattern generator 66 produces random numbers $X_{66}$. An adder 68 adds the random numbers $X_{66}$ to the information signal stream $X_{364}$ to provide an information sequence $X_{68}$. A mixer mixes the information sequence $X_{68}$ with an output $X_{70}$ of another information signal source 70, applying the resulting information to a transmitter 74. Why the random numbers are used will not be described for such has already been described in relation to the first embodiment.

As stated above, the controller controls the operation timings of the random number generator 66 and signal source 70 and the transmission from the transmitter 74 in addition to the operations of the signal generator 60 and start pattern generator 62.

As shown in FIG. 3B, the receive station includes a receiver 80 which receives a signal $X_{80}$. The following description will concentrate on processing of the start pattern ST and signal stream AA ... A which are contained in the received signal $X_{80}$. In this particular embodiment, another signal processing arrangement, not shown, is assigned to the processing of a signal which is outputted by the another information signal source 70. A start pattern detector 82 detects the start pattern ST out of the received signal $X_{80}$. Timed to the detection of the start pattern ST, information pattern receive means 84 receives the information patterns which follow the start pattern ST. As shown, the information pattern receive means 84 comprises a random pattern generator 86 adapted to generate the same random numbers $X_{86}$ as the random numbers $X_{66}$, and adder 88, and a SP converter 90. Random numbers are added to the output $X_{80}$ of the receiver 80 to recover a signal stream which corresponds to an information signal stream $X_{64}$ which was prepared at the transmit station. The SP converter 90 serves to transform the serial summation output to parallel information in order to facilitate the subsequent processing.

The recovered information signal sequence $X_{88}$ outputted by the adder 88 will be described in detail. As shown in FIG. 4, in the signal stream $X_{88}$, the start pattern ST and the M information patterns AA ... A transmitted from the transmit station are replaced with other patterns $ST_j A_{1j} A_{2j} \ldots A_{Mj}$ due to noise which is involved in the transmission path. Here, j is representative of the order of the signal stream which is received in a single communication section. It will be noted that the maximum value J of j's is not always equal to the number L of transmissions from the transmit station because the receive station may fail to detect a start pattern due to noise or accidentally detect a start from another information section.

In FIG. 4, the start pattern $ST_j$ and the information patterns $A_{mj}$ are each represented on a bit basis as follows:

$$ST_j = S_j^1 S_j^2 \ldots S_j^R \ (j=1, 2, \ldots, J)$$

$$A_{mj} = a_{mj}^1 a_{mj}^2 \ldots a_{mj}^k$$

$$\begin{pmatrix} m = 1, 2, \ldots M \\ j = 1, 2, \ldots, J \end{pmatrix}$$

So long as all the patterns are free from errors in the transmission path and misdetection of start patterns, their bits are maintained as:

$$S_j^1 S_j^2 \ldots S_j^R = S^1 S^2 \ldots S^R \ (j=1, 2, \ldots, J; J=L)$$

$$a_{mj}^1 a_{mj}^2 \ldots a_{mj}^k = a^1, a^2 \ldots a^k \ (m=1, 2, \ldots, M; j=1, 2, \ldots, J; J=L)$$

Hence, $$ST_j = ST \ (j=1, 2, \ldots, J; J=L)$$

$$A_{mj} = A \ (m=1, 2, \ldots, M; j=1, 2, \ldots, J; J=L)$$

The parallel outputs of the SP converter 90 of the information pattern receive means 84 are stored in a store 92. Eventually, the store 92 stores the signal stream made up of M patterns J times as shown below:

$$A_{11} A_{21} \ldots A_{M1}$$
$$A_{12} A_{22} \ldots A_{M2}$$
$$\cdot \quad \cdot \quad \quad \cdot$$
$$\cdot \quad \cdot \quad \quad \cdot$$
$$\cdot \quad \cdot \quad \quad \cdot$$
$$A_{1J} A_{2J} \ldots A_{MJ}$$

The patterns held in the store 92 as described above include those which have been erroneously stored despite that they are alien ones due to accidental detection of start patterns out of other information sections. In this particular embodiment, such undesired patterns are removed by the following procedure.

Figure 5:
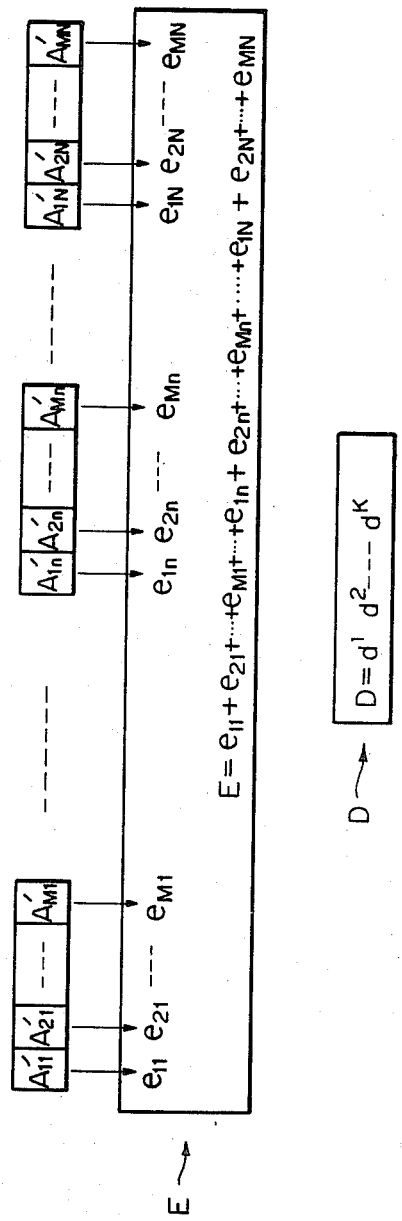
FIG. 5 further shows the format of signals which appear in the final section of the circuitries shown in FIGS. 3A and 3B.

Specifically, a first majority circuit 94 checks the pattern sequence $A_{1j}, A_{2j}, \ldots, A_{Mj}$, which is the "j" received sequence, for majority on the basis of bits which represent the same information, thereby deciding a single pattern $D_j = d_j^1 d_j^2 \ldots d_j^k$. Here, $d_j^k$ is the result of majority decision of $a_{1j}^k, a_{2j}^k, \ldots, a_{Mj}^k$; if the number of ONEs is greater than that of ZEROs, then $d_j^k=1$. Assuming that the number of noncoincident bits between the pattern $D_j$ and the pattern $A_{mj}$ is $b_{mj}$, a first noncoincidence adder 96 performs a calculation $B_j = b_{1j} + b_{2j} + \ldots + b_{Mj}$ as shown in FIG. 4. If the sum $B_j$ is smaller than a predetermined reference value $\alpha$, $B_j < \alpha$, a selector 98 selects the pattern sequence $A_{1j}, A_{2j}, \ldots, A_{Mj}$ regarding that it does not represent entirely alien information. FIG. 5 shows a condition wherein N signal sequences were selected by the selector 98. Specifically, N signal sequences with little error are selected out of the J signal sequences which are stored in the store 92 with $D_j$ used as a reference, with the result that $A'_{1n}A'_{2n} \ldots A'_{Mn}$ coincides with the certain "j" $A_{1j}A_{2j} \ldots A_{Mj}$.

Thereafter, a second majority circuit 100 performs decision by majority on the respective bits of the M×N patterns $A'_{11}, A'_{21}, \ldots, A'_{M1}, \ldots, A'_{1n}, A'_{2n}, \ldots, A'_{Mn}, \ldots A'_{1N}, A'_{2N}, \ldots, A'_{MN}$ which represent the same information. Eventually, the majority circuit 100 produces a single pattern $D = d^1 d^2 \ldots d^k$ as shown in FIG. 5. A second noncoincidence adder 102 measures the quality of the output pattern D of the second majority circuit 100. Assuming that the number of noncoincident bits between the patterns D and $A'_{mn}$ is $e_{mn}$, the second noncoincidence adder 102 performs the following equation as shown in FIG. 5:

$$E = e_{11} + e_{21} + \ldots + e_{M1} + \ldots + e_{1n} + e_{2n} + \ldots + e_{mn} + \ldots + e_{1N} + e_{2N} + \ldots + e_{MN}$$

This implies that the greater the sum E, the greater the error in the transmission path and, therefore, the poorer the quality of the pattern D is.

A decision circuit 104 determines whether the output E of the second noncoincidence adder 102 is smaller than a predetermined reference value $\rho(N)$. If $E < \rho(N)$, the pattern D is regarded qualified and ready to be processed by signal processing means 106. The reference value $\rho(N)$ is variable depending upon the receiver N. That is, the value $\rho(N)$ increases if the number of receivers is relatively large and decreases if otherwise. This is because the number of patterns to be subjected to majority decision decreases with N to render the measurement of E inaccurate; to enhance the reliability of D, the value $\rho(N)$, too, should be reduced.

Meanwhile, the pattern D determined by the second majority circuit 100 is applied to a parity check circuit 108. In this connection, the information pattern A prepared at the transit station is provided with parity check bits beforehand. When determined normal by the parity check circuit 108 and acceptable by the decision circuit 104, the pattern D is processed by a signal processor 110. As in the first embodiment, since the error rate of each bit which constitutes the pattern D is low, the effect of the parity check is considerable.

In summary, the apparatus in the illustrative embodiment is constructed to determine a signal pattern D having the least error rate by decision by majority, counts noncoincident bits between the pattern D and each of M×N patterns which are selected by a selector out of repeatedly received patterns, and allows the pattern D to be processed only if the count is smaller than a reference count. That is, the system processes the pattern D by equivalently measuring a bit error rate in the transmission path with D used as a reference. The advantage attainable with such a system is that since the accuracy of bit error rate measurement increases with the number of bits in the pattern A.

In addition, since L pattern sequences are sequentially transmitted from a transmit station, the probability that any of the information signal sequences is received is high despite burst errors which possibly occur in the transmission path due to fading and other causes, thereby offering a diversity effect with respect to time. Naturally, random errors are also corrected because decision by majority is made on the selected M×N patterns.

Various modifications will become possible for those skilled in the art after receiving the teachings of the present disclosure without departing from the scope thereof. For example, the roles of circuits 42, 44, 46, 48, 50, 52 and 54 as enclosed by dotted lines in FIG. 1 or the circuits 92, 94, 96, 98, 100, 102, 104, 106, 108 and 110 as done so in FIG. 2 may readily be fulfilled by a microcomputer. Also, the start pattern detectors 32 and 82 and the received pattern receive means 34 and 84 may be implemented by digital circuits to promote a space- and cost-effective design.

What is claimed is:

1. An apparatus for processing a digital received signal in which the same information appears repeatedly, comprising:

start pattern detector means for detecting a start pattern which precedes M repetitive information patterns which are transmitted;

information pattern receive means for receiving the M information patterns timed to detection of the start pattern by said start pattern detector means;

store means for storing the M information patterns which are received by said information pattern receive means;

majority decision means for applying majority decision to the M information patterns, which are stored in said store means, on a basis of bits which represent the same information so as to determine a single pattern;

noncoincidence adder means for determining noncoincident bits between the single pattern decided by said majority decision means and each of the M information patterns stored in the store means and, then, adding the noncoincident bits;

decision means for determining that the pattern decided by the majority decision means is acceptable for processing when a result of summation by the noncoincidence adder means is smaller than a predetermined reference value; and signal processor means for processing the pattern decided by the majority decision means when said decision means has decided that the pattern is acceptable.

2. An apparatus as claimed in claim 1, wherein the information pattern includes parity bits, the signal processor means comprising parity check means for performing parity check on the single pattern which is decided by the majority decision means, and second signal processor means for determining the pattern decided by the majority decision means is normal and for processing the pattern only when the decision means has decided that the pattern is acceptable and a result of the parity check performed by said parity check means is normal.

3. An apparatus for processing a digital received signal in which the same information appears repeatedly, comprising:

start pattern detector means for detecting a start pattern which precedes a signal sequence in which M same information patterns appear repeatedly, said signal sequence being transmitted L consecutive times;

information pattern receive means for receiving the M information patterns timed to detection of a start pattern by said start pattern detector means;

store means for storing the M information patterns which are received by said information pattern receive means;

first majority decision means for applying majority decision to the M information patterns, which are stored in said store means, on a basis of bits which are representative of the same information so as to decide a single pattern;

first noncoincidence adder means for determining noncoincident bits between the single pattern decided by said first majority decision means and each of the M information patterns stored in the store means and, then, adding the numbers of noncoincident bits;

selector means for selecting N of the signal sequences, each of which comprises the M information patterns, those in which a sum of the noncoincident bits is smaller than a predetermined reference value;

second majority decision means for applying majority decision to all the $M \times N$ information patterns contained in N signal sequences which are selected by said selector means so as to decide a second single pattern;

second noncoincidence adder means for determining noncoincident bits between the result provided by said second majority decision means and each of the $M \times N$ information patterns which are selected by the selector means and then adding the numbers of noncoincident bits;

decision means for deciding that the pattern decided by the second majority decision means is acceptable for processing when a sum of the noncoincident bits provided by said second noncoincidence adder means is smaller than a predetermined value $p$ (N) which is determined by the N; and signal processor means for processing the pattern decided by the second majority decision means when said decision means has determined that the pattern is acceptable.

4. An apparatus as claimed in claim 3, wherein the information pattern includes parity bits, the signal processor means comprising parity check means for performing parity check on the second single pattern which is decided by the second majority decision means, and second signal processor means for determining the pattern decided by the second decision means is normal and for processing the pattern when the decision means has decided that the pattern is acceptable and a result of the parity check performed by said parity check means is normal.

* * * * *